United States Patent [19]

Kraemer

[11] 4,189,264
[45] Feb. 19, 1980

[54] CUTTING INSERT AND CHIP CONTROL ASSEMBLY

[75] Inventor: Rolf H. Kraemer, Gurnee, Ill.

[73] Assignee: Fansteel Inc., North Chicago, Ill.

[21] Appl. No.: 942,552

[22] Filed: Sep. 15, 1978

[51] Int. Cl.² .............................................. B26D 1/12
[52] U.S. Cl. ......................................... 407/2; 407/6;
 407/114; 407/115; 407/101
[58] Field of Search ................... 407/2, 3, 4, 5, 6, 100,
 407/101, 115, 120, 113, 114

[56] References Cited

U.S. PATENT DOCUMENTS

| | | | |
|---|---|---|---|
| 2,870,523 | 1/1959 | Richard | 407/6 |
| 3,416,209 | 12/1968 | Contrucci et al. | 407/101 |
| 3,694,879 | 10/1972 | Kennicott et al. | 407/2 |

Primary Examiner—Harrison L. Hinson
Attorney, Agent, or Firm—Barnes, Kisselle, Raisch & Choate

[57] ABSTRACT

A polygonal insert of hard cutting material used in single and multiple toolholding means to receive the same, the insert comprising a wafer having conjunctive side walls lying in planes intersecting each other and parallel to the axis of the insert, one or more faces of the insert normal to the sides being depressed to form a peripheral ridge around the insert composed of a cutting land, either negative or positive, and downwardly extending walls to provide a polygonal recess on the face of the insert. A chip breaker insert with the same configuration as the basic insert with smaller lateral dimensions is provided to position selectively within the peripheral walls of the ridge to be clamped in place as a chip breaker. Also, a support anvil is utilized below the insert supporting the face within the ridge walls on the base of the recess in the cutting holder.

9 Claims, 9 Drawing Figures

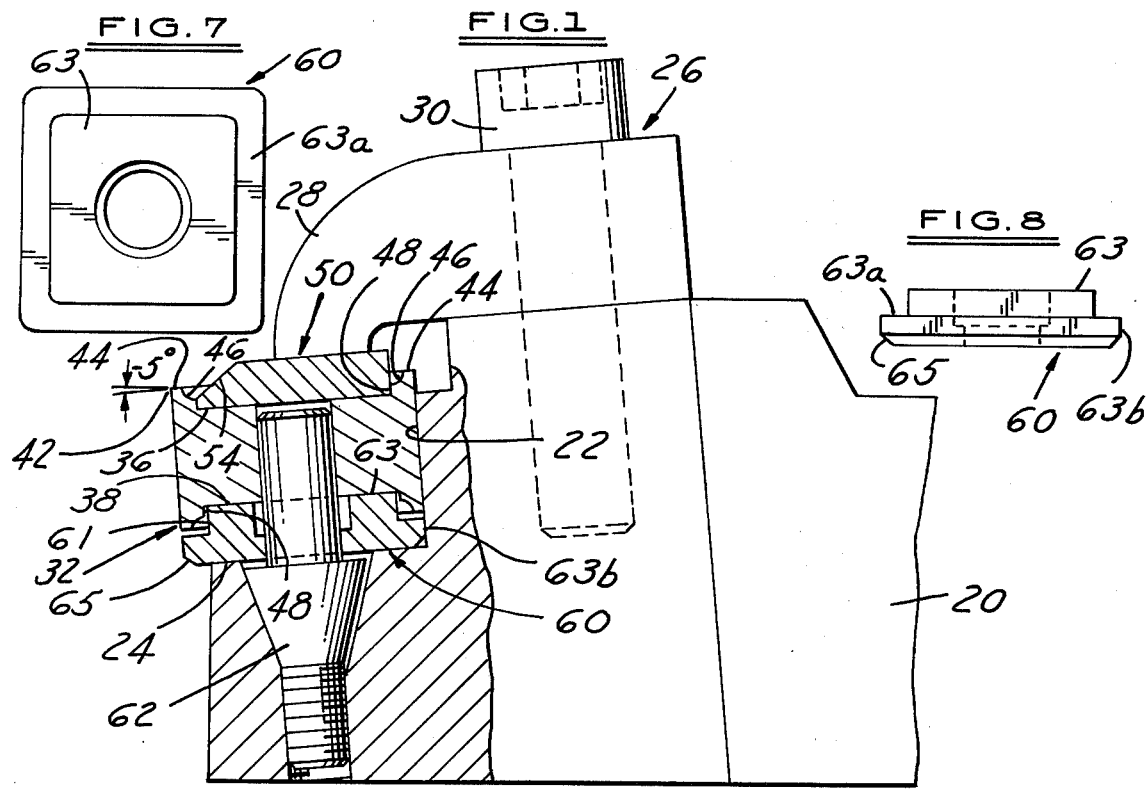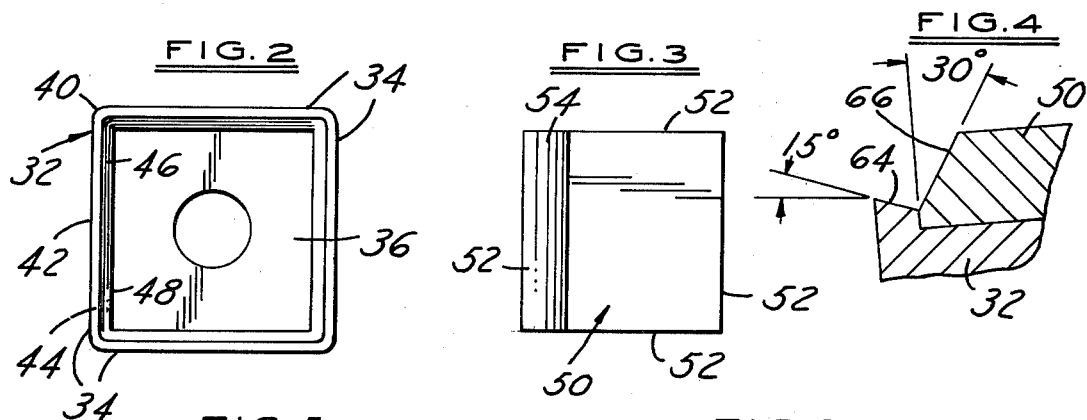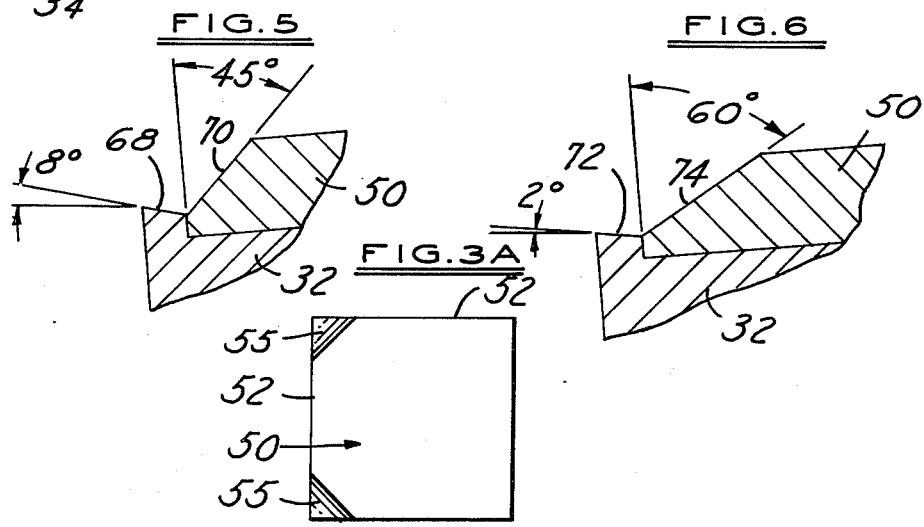

CUTTING INSERT AND CHIP CONTROL ASSEMBLY

FIELD OF INVENTION

Hard metal cutting inserts to be supported in single and multiple toolholder means together with a separable chip control plate and a support anvil.

BACKGROUND OF THE INVENTION

Tungsten carbide and other hard metals and hard materials have been used extensively since the middle of World War II as a cutting material in production machines. Initially, indexable inserts had an elongate form adjustably supported in a toolholder so that the insert could be reground and moved upwardly to the cutting position. At times chip breaker grooves were ground into the top surface of the insert. The evolution of the industry was such that the so-called elongate or slug-type inserts which needed to be reground were for the most part replaced by rather thin, wafer-like, indexable inserts which were called throw-away inserts because of the fact that once they were used for a certain period of time, they were then discarded rather than reground. In connection with inserts of this kind and even with the earlier high speed steel inserts, it was known to utilize chip breakers positioned adjustably on the top of the cutting inserts and clamped in place. Examples of this type of chip breaker insert are found in the U.S. Pat. to Moore, U.S. Pat. No. 2,181,023, dated Nov. 21, 1939; Richard U.S. Pat. No. 2,870,523, dated Jan. 27, 1959; and Dowd U.S. Pat. No. 3,137,917, dated Jan. 23, 1964.

Other variations of the clamping of chip breakers on the top of inserts are found in the pertinent art.

In many instances, the chip breaker function has been achieved in throwaway inserts by grinding in or molding in a chip breaker groove inside the cutting edge as evidenced, for example, by the above-referenced Dowd patent and more recently by a U.S. patent to Kelm, U.S. Pat. No. 3,341,920, dated Sept. 19, 1967. A U.S. patent to McCreery and Jones, U.S. Pat. No. 3,973,307, dated Aug. 10, 1976, shows a drop center insert.

The present invention contemplates an improvement on the previous structures in the form of an insert which is provided with a ridge or dike around the periphery to present the cutting edge and also to retain a chip breaker insert as well as a support anvil for use in single and multiple toolholding means such as single point toolholders, boring bars, and milling cutters.

The object is to provide an insert with protection for both the top and the bottom and which can be utilized both for negative rake and positive rake cutting edges and one which is more independent of the feed rate and the rotation rate of the work.

The improved design provides satisfactory chip control over a broad range of depth of cut in rotation and it has the advantage that it can be used either with or without the separate mechanical chip breaker. In addition, it can be utilized for not only indexing but also inverting and indexing for all of the cutting sides on each surface, these being protected by the support anvil in operation.

Other objects and features of the invention will be apparent in the following description and claims in which the principles of operation of the invention are set forth together with details of construction and operation which will enable a person skilled in the art to practice the invention, all in connection with the best mode presently contemplated for the construction of the device.

DESCRIPTION OF THE DRAWINGS

Drawings accompany the disclosure, and the various views thereof may be briefly described as:

FIG. 1, a view of a toolholder partly in section showing the improved insert for negative rake cutting in conjunction with a mechanical chip breaker and support anvil in assembled relation.

FIG. 2, a plan view of the insert.

FIG. 3, a plan view of the chip breaker.

FIG. 3A, a plan view of a modified chip breaker.

FIGS. 4, 5 and 6, illustrations of various positive rake angle cutting edges in conjunction with the mechanical chip breakers as they are presented to the work when installed in a 5° negative rake toolholder.

FIG. 7, a plan view of the support anvil.

FIG. 8, a side view of the support anvil.

REFERRING TO THE DRAWINGS

In FIG. 1, a toolholder shank 20 has a forward corner recess with the usual supporting side walls and bottom walls. The back side wall 22 is illustrated at right angles to the bottom support wall 24. A top clamp 26 has a forward nose portion 28 which overlies the insert recess, the clamp being held in position by a clamping screw 30. The insert of the invention is shown at 32 in section and in plan in FIG. 2. The insert has four sides 34 with parallel top and bottom faces 36 and 38 perpendicular to the sides. The side walls 34 join conjunctively at the corners with a conventional radius 40 provided. The thickness of the body of the insert is typically somewhat less than that of a standard state-of-the-art insert between the surfaces 36 and 38. However, the overall height from bottom face 38 to cutting edge 42 is identical to state-of-the-art inserts so that inserts of this invention fit standard toolholders or holding means.

Surrounding the surfaces 36 and 38 are peripheral ridges which will be referred to as dikes. Each dike originates at a cutting edge 42. A land 44 may ascend as a flat or curved plane to provide for negative rake cutting; or it may have a neutral (zero degree) rake so that it will provide negative rake cutting when the insert is used in a negative rake toolholder, as illustrated in FIG. 1 where a neutral rake land on the insert provides 5° negative rake when used in a 5° negative rake toolholder. The land also may descend as a flat or curved plane to provide for positive rake cutting; this is illustrated as lands 64, 68 and 72 for various positive rake angles illustrated and designated in FIGS. 4, 5 and 6, respectively.

Behind the land 44, a surface 46, as shown in FIG. 1, descends as a smooth, curved, or flat plane, terminating at an intersection with vertical wall 48, which descends precipitously to junction with surfaces 36 and 38 at the top and bottom respectively.

The walls 48 have a loose clearance fit around the periphery 61 of a support anvil 60 shown in FIGS. 1, 7 and 8. The bottom surface 38 of the insert is placed in contact with the top surface 63 of the anvil to provide support to the insert. The anvil has a chamfer 65 around the periphery at the base to permit it to fit readily into the pocket formed by back side wall 22 and bottom support wall 24 in toolholding shank 20. The anvil 60 enlarges at a ledge 63a to provide a protective flange 63b which is dimensioned similarly to the inserts to seat in the insert pockets and extend to the margins of the insert. A stepped hole in the anvil has a stepped central hole for independent retention if desired.

The vertical walls 48 of the dikes on the insert terminate and junction at a 90° angle with top surface 36 and bottom surface 38 of the insert.

In some embodiments of this invention, the insert may be used as described above, without a mechanical chip breaker. In such embodiments, the insert abuts anvil 60 and is retained in the toolholder shank 20 by locking pin 62, or clamp 26, or both in combination.

In other embodiments, the vertical walls 48 of the insert receive selectively and provide a complementary fit with outer walls 52 of a so-called mechanical chip breaker 50. The outer walls of this chip breaker are of the same number as the insert to which it is to be applied. One or more edges along the top of the chip breaker are angled at 54 at a desired, selected angle to provide a chip breaking surface which cooperates with plane or curved surface 46 on the insert, as illustrated in FIG. 1, to provide a chip breaking groove. The angled surface 54 can be curved, if desired. The angle or curvature can be selected and varied over a broad range for different mechanical chip breakers, depending on the specific cutting requirements.

As an alternate construction, the corners along one edge of the top of the mechanical chip breaker may be chamfered as shown at 55 in FIG. 3A at a selected planar angle or curved surface for further improved and broadened machining characteristics. The chamfers 55, furthermore, can be employed solely or in combination with angled or curved surface 54 of FIG. 3, if desired. In addition, either or both surface 54 and chamfers 55 can be a wave form, or be a multi-planar or complex curved form, if desired.

In embodiments which utilize a mechanical chip breaker, the mechanical chip breaker is secured by clamp 26 against insert 32, which may be further retained by locking pin 62. The locking pin 62 may be replaced by a headed screw which retains the anvil, which in turn stabilizes the insert.

In FIGS. 4, 5 and 6, various positive cutting lands are illustrated, with the insert situated in a 5° negative rake toolholder. The angles depicted represent the positive rake as presented to the work. In FIG. 4, a 15° positive land 64 is shown with a 30° face surface angle 66 on the chip breaker 50. In FIG. 5, an 8° positive land 68 is provided with a 45° chip breaker angle 70. In FIG. 6, a 2° positive land 72 is shown with a 60° chip breaker surface angle 74. Various combinations can be selected for various applications and requirements.

The combined structures have a number of advantages over regular inserts, which advantages will permit the reduction of the inventory of inserts manufacturers and users must carry. Effective chip control is possible in all applications because of the variations that can be built independently into the rake angles of the insert and the mechanical chip breakers. Also, both positive and negative inserts can have the same number of cutting edges. Where the devices are used on programmed machines, the programmer can have less concern about breaking the chips by selecting the proper feed rate and rotation for a variety of material, depth of cut, coolant, no coolant, lead angles, condition of machine and so forth. In other words, the device gives a much broader range and with less critical controls than the average insert in use today. Further, the programmer now can have the latitude to program his machine to maximum capability of the machine and piece part, then select and fit the preferred combination of insert and mechanical chip breaker geometries to the specific application.

In addition, the enormous number of combinations of insert and mechanical chip breaker geometries that are possible permit smaller shops to have a broad machining capability because of the wide flexibility thus made available.

Another advantage lies in the fact that the chip breaker protects the top of the insert from buildup due to chip wear and rubbing, and the insert is protected also against chipping by the chip breaker insert on the top and by the anvil on the bottom which insures that unused edges will not be damaged to prevent indexability. As has been pointed out, the device can also be without the chip breaker in some applications which further increases the flexibility of the unit, especially for high feed rates.

I claim:

1. An indexable cutting insert assembly to be removably disposed in a prepared recess in a toolholder which comprises:
   (a) a ploygonal insert of hard cutting material having conjunctive side walls lying in planes intersecting each other at predetermined angles and parallel to the axis of the insert and having at least one face surface normal to said walls and said axis, and spaced inwardly of said walls,
   (b) a peripheral dike surrounding said face surface having a cutting land with an outer cutting edge at the side walls and extending inwardly to an inner edge and having a secondary wall dropping precipitously within the inner edge to provide a retaining wall, and
   (c) a chip breaker insert selectively positionable within said retaining wall having outer walls to fit complementally within said retaining wall and provided with a surface above at least one of said outer walls to serve as a chip breaker surface in cooperation with a cutting land on said insert.

2. An indexable cutter assembly as defined in claim 1 in which said chip breaker inset has at least one exposed edge adjacent an insert cutting edge angled upwardly and away from said cutting edge to serve as a chip breaker surface in conjunction with said secondary wall on said insert.

3. An indexable cutter assembly as defined in claim 1 in which said chip breaker insert has at least one corner angled upwardly and away from a corner of said insert to serve as a chip breaker surface.

4. An indexable cutting insert assembly as defined in claim 1 in which said peripheral dike is formed on each face of said insert.

5. An indexable cutting insert assembly as defined in claim 4 which includes a support anvil in the form of a polygonal insert having outer walls to fit complementally within the retaining wall of said insert on a bottom side as positioned in a tool to serve as a support for said insert and having a thickness greater than the vertical depth of said peripheral dike.

6. An assembly as defined in claim 5 in which said support anvil has a surrounding ledge and flange dimensioned similarly to said insert to seat against the walls of an insert holder and to project outwardly to protect the bottom cutting edges of an assembled insert.

7. An indexable cutting insert as defined in claim 1 in which said land lies in a plane parallel to said faces to serve as a negative rake cutting edge surface.

8. An indexable cutting insert as defined in claim 1 in which said land lies in a plane tilted relative to the axis of the insert from said cutting edge to serve as a cutting edge and surface.

9. An indexable cutting insert as defined in claim 1 in which said land lies in a plane tilted downwardly toward the center of the insert from said cutting edge to serve as a positive rake cutting edge and surface.

* * * * *